(12) United States Patent
Nikolaus et al.

(10) Patent No.: US 9,971,999 B2
(45) Date of Patent: May 15, 2018

(54) SYSTEMS, METHODS, AND INTERFACES FOR UTILIZING TWO DIMENSIONAL CODES FOR PRINT CURRENTNESS

(75) Inventors: Justin Nikolaus, Minneapolis, MN (US); Shannon O'Brien, Saint Paul, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 1260 days.

(21) Appl. No.: 13/336,062

(22) Filed: Dec. 23, 2011

(65) Prior Publication Data
US 2013/0162400 A1    Jun. 27, 2013

(51) Int. Cl.
*G06F 15/16*    (2006.01)
*G06Q 20/12*    (2012.01)
*G06Q 20/32*    (2012.01)

(52) U.S. Cl.
CPC ....... *G06Q 20/123* (2013.01); *G06Q 20/3276* (2013.01)

(58) Field of Classification Search
CPC .................. G06C 20/3276; G06C 20/123
USPC ........................................................ 709/217
See application file for complete search history.

(56) References Cited

U.S. PATENT DOCUMENTS

| | | | | |
|---|---|---|---|---|
| 6,631,386 B1* | 10/2003 | Arun | ................ | G06F 17/30309 |
| 2009/0108057 A1* | 4/2009 | Mu | .................. | H04M 1/72561 235/375 |
| 2010/0306318 A1* | 12/2010 | Fitzpatrick | ........ | G06F 17/30867 709/206 |
| 2011/0145068 A1* | 6/2011 | King | ..................... | G06F 17/211 705/14.55 |
| 2012/0085829 A1* | 4/2012 | Ziegler | .................... | G09F 3/14 235/493 |
| 2012/0132701 A1* | 5/2012 | Nakagawa | ........ | G06F 17/30879 235/375 |

* cited by examiner

*Primary Examiner* — Phuoc Nguyen

(57) ABSTRACT

A method includes receiving a signal associated with a two dimensional code where the two dimensional code is associated with a set of data. The method further includes generating and transmitting a currentness signal associated with the set of data. Another embodiment includes the currentness signal being associated with at least one of currentness information, supplement information and a print date of supplement information, wherein the currentness information comprises a statement regarding currentness of the set of data and the supplement information comprises a statement regarding an existence of a supplement. Yet another embodiment includes receiving a download signal associated with a purchase transaction, the set of data and an electronic file and then generating and transmitting a delivery signal associated with the electronic file.

14 Claims, 6 Drawing Sheets

US 9,971,999 B2

SYSTEMS, METHODS, AND INTERFACES FOR UTILIZING TWO DIMENSIONAL CODES FOR PRINT CURRENTNESS

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2011 Thomson Reuters.

TECHNICAL FIELD

Various embodiments of the present invention concern systems, methods and interfaces for utilizing two dimensional codes for print currentness.

BACKGROUND

For ages, books have provided a wealth of information. In 1440, the invention of the Gutenberg printing press revolutionized the book printing world by producing relatively inexpensive books on paper, as opposed to parchment. This infamous idea sparked an information age where persons other than clergy could afford and/or gain access to printed books. While several advancements in printing books have occurred over the years, in 1971, Michael Hart, founder of Project Gutenberg, used a Xerox Sigma V mainframe computer to create the first digitized, electronic book (herein an example of an "eBook"). Using the mainframe computer, he typed (i.e., digitized) a copy of the Declaration of Independence. Hart believed that computers would one day become accessible to the public and decided to make literary works available in electronic form.

With the creation of the internet, various eBooks started to gain steam. Initially, eBooks were generally written for specific technical areas. For instance, the subject matter may have ranged from technical manuals to manufacturing techniques. These eBooks were meant for a small, specific audience and were few and far between. Circa 2001, major publishing companies took notice of the eBook trend. Consequently, electronics hardware manufacturers began to develop eBook readers (herein individually also referred to as an "eReader") in hopes of capitalizing on the eBook phenomenon. In keeping with this emerging trend, publishers launched online stores and partnered with eReader manufacturers to further establish themselves in the eBook marketplace.

Due to the global impact of eBooks, publishers are seeking a revenue balance between the print world and the digital world. Presently, print revenue generally holds steady or decreases while digital revenue steadily increases. However, publishers are currently viewing digital revenue and print revenue as competing, not complementing, revenue streams. Consequently, the significant benefit of increasing overall revenue occurs when print revenue and digital revenue are complementary. Therefore, a publisher may want to continue profiting from print revenue while increasing digital revenue. For example, a user may have a print version of a book but may not know if it is the most current version. On the other hand, a user may know it is the most current year for the print book but may not know if a supplement exists. For instance, in legal books, supplements are added to the current year print book to update certain sections but are manually inserted into the print book. Additionally, a user may want an electronic version of the most recent print version. Various publishers, including THOMSON REUTERS®, provide digital versions of print books and/or supplements. A publisher that has the ability to present a print book's currentness while providing options to view the most current version and/or supplement, including electronic and/or online versions, could greatly complement the print revenue and the digital revenue.

SUMMARY

We have discovered the need for utilizing a two dimensional code for print currentness and using the print currentness to provide a digital copy of a print book. The method includes receiving a signal associated with a two dimensional code where the two dimensional code is associated with a set of data. The method further includes generating and transmitting a currentness signal associated with the set of data.

Advantageously, the invention allows the currentness signal to be associated with currentness information, supplement information and print date of supplement information. All of the listed information is gathered from the print version of the book and may then be ultimately displayed to aid the user in determining whether the print book is current. Moreover, the invention permits the purchasing and downloading of an electronic book (eBook) in addition to viewing the currentness information. This allows the user to see the information regarding the print version and provides options to view, access and/or purchase the most current version either online, in print or by downloading an eBook. Providing the user these options potentially generates additional revenue for the publisher by informing the user of the currentness and then providing options as to how he/she would like to view the most current version.

DETAILED DESCRIPTION OF THE EXEMPLARY EMBODIMENT(S)

The description includes many terms with meanings derived from their usage in the art or from their use within the context of the description. However, as a further aid, the following examples are presented. The term "two dimensional code" is a code that carries information in two directions such as horizontal and vertical. In contrast, a one dimensional code (e.g., a bar code) carries information in one direction, either horizontal or vertical. Examples of two dimensional codes include quick reference codes, quick response codes, Smart Tags by MICROSOFT®, and two dimensional bar codes. The term "data" includes, but is not limited to, a unique resource locator (URL), a print book title, a publishing year, a print date and/or any combination thereof that may provide a unique identifier. Exemplary unique identifiers may include a version identifier, a supplement identifier and a family identifier. An exemplary family identifier is print book X's title. An exemplary version identifier for print book X is print book X's title along with a publishing year to establish a version sequence within the family. An exemplary supplement identifier is print book X's title along with the print date of the supplement to establish a supplement sequence within the specific version identifier. The term "current" or "currentness" refers to belonging in the present time and/or being prevalent, especially at the present time. The term "supplement" is a section added to, for example, a book and/or document to give further information and/or to correct errors. For example, in the legal publishing industry, a supplement is sometimes called a "pocket part." In another example, in the print advertising industry, a supplement is sometimes called an "insert." The term "electronic file" includes, but is not limited to, an electronic document, an eBook, and a markup language file. Examples of markup languages, and corresponding markup language files, include HyperText Markup Language (HTML), Extensible Markup Language (XML), Extensible HyperText Markup Language (XHTML) and the like.

Exemplary System

Figure 1:
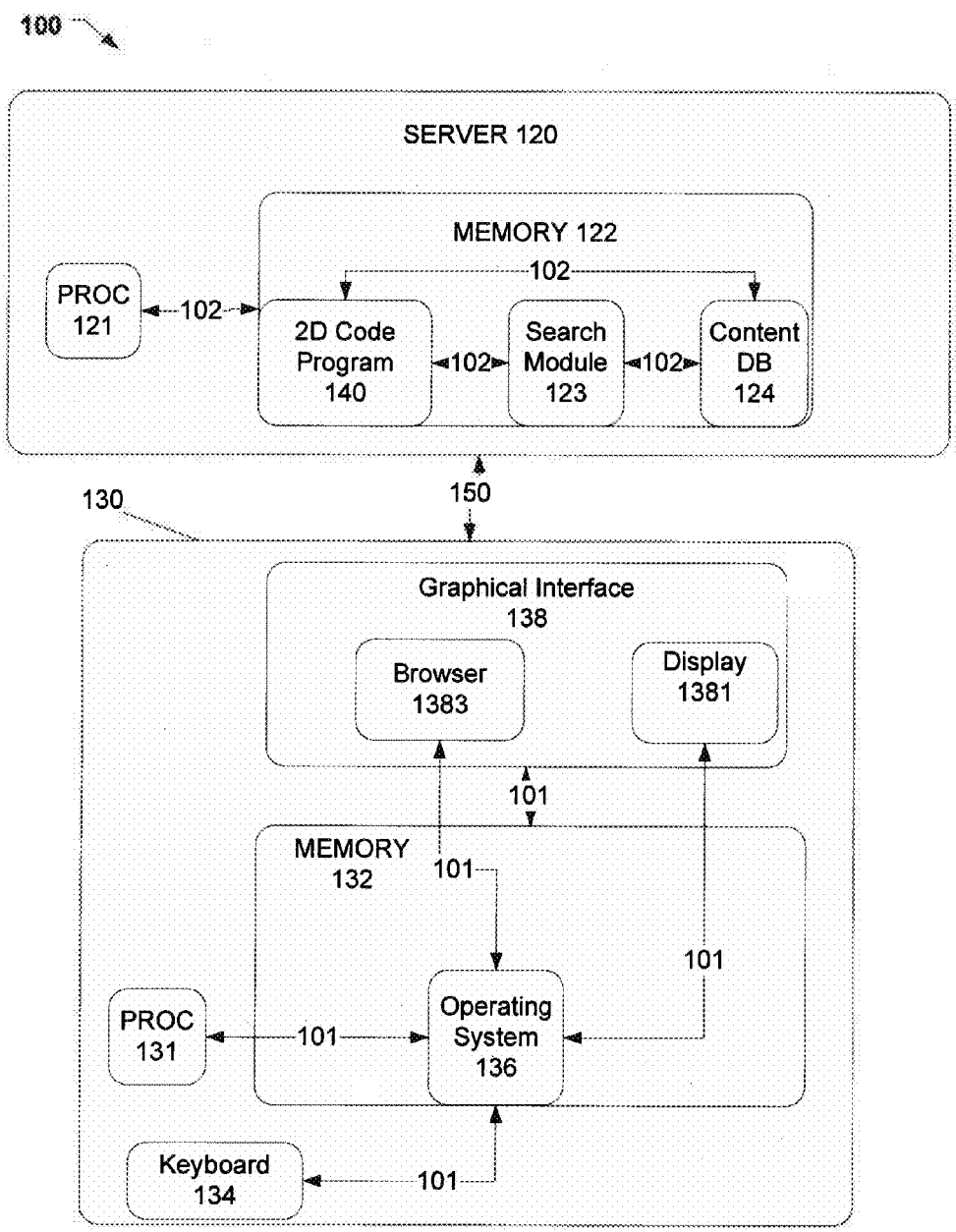
FIG. 1 is an exemplary system 100 which corresponds to one or more embodiments of the invention.

FIG. 1 shows an exemplary system 100, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to invoke a unique resource locator (URL) on access device 130. Server 120 includes a processor 121 and a memory 122, wherein the memory 122 further includes a search module 123, a content database 124 and a two dimensional (2D) code program 140. All of these elements are connected via computer bus 102, which is shown in various pathways throughout the server 120. Computer buses 101, 102 and/or 103 (see FIG. 1A for computer bus 103) are buses that transmit information between the access device's components/elements and/or between multiple access devices. For example, computer bus 101 and computer bus 102 aid in transmitting information (e.g., a signal) between access device 130 and server 120. Processor 121 may use computer bus 102 to queue a request that is to be transmitted through a signal, from server 120, via a wireless or wireline transmission channel 150 and is then ultimately received by processor 131 through the utilization of computer bus 101. Generally, server 120 transmits the signal via a wireless or wireline transmission channel 150 to at least one access device, such as access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a search module 123, a content database 124 and a 2D code program 140.

Search module 123 includes one or more search engines and related user-interface components (not shown), for receiving and processing queries against content database 124. Content database 124 takes the exemplary form of one or more electronic, magnetic, and/or optical data-storage devices. Content database 124 includes content and/or data relating to print publications. In some embodiments, access to server 120, the content database 124, and the 2D code program 140 is provided once a set of user credentials are authenticated. For instance, user credentials may be a user name and associated password. Once the credentials are successfully authenticated on server 120, the signal is transmitted via a wireless or wireline transmission channel 150 to access device 130 and access is granted to the server 120, the content database 124, and the 2D code program 140. For purposes described herein, successfully authenticating a set of user credentials means the user credentials were accepted by an authentication system (not shown but well known to those skilled in the art). This successful authentication allows for transmitting and/or receiving information (e.g., an eBook) from server 120 to access device 130. Furthermore, the access device 130 receives the eBook through the processor 121 and/or the operating system 136 which ultimately displays the eBook on display 1381, via computer bus 101.

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media well known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136. Operating system 136 is coupled to graphical interface 138 and various other components, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134, the processor 131. For example, the keyboard 134 sends inputs, via computer bus 101, to the operating system 136. The operating system 136 then determines the 2D code program 140 needs to be utilized, engages the 2D code program 140 through a signal via a wireless or wireline transmission channel 150, accepts the 2D code program output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the 2D code program 140 is initiated, a display 1381 is defined in memory 132 and rendered on graphical interface 138. Upon rendering, the graphical interface 138 presents the data/results in association with the modules from the 2D code program 140 as further discussed herein.

Figure 1A:
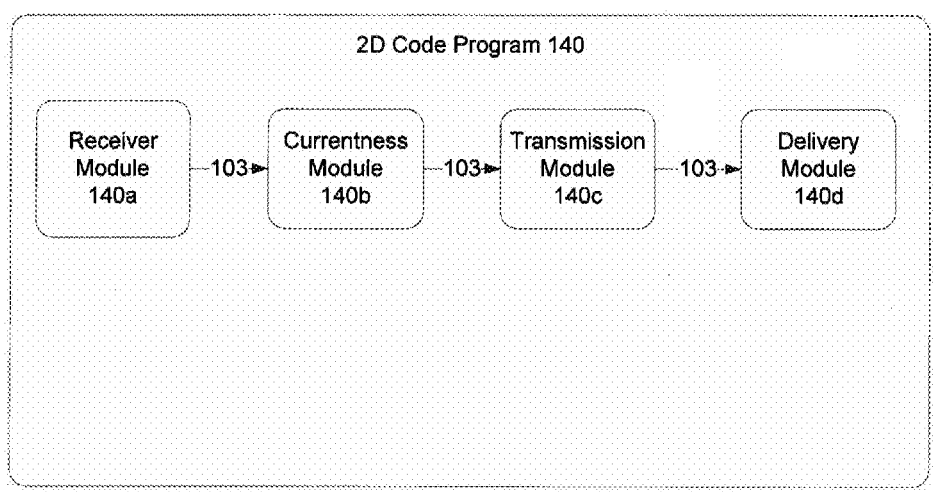
FIG. 1A is an exemplary 2D code program 140 which corresponds to one or more embodiments of the invention.

FIG. 1A illustrates an exemplary embodiment of a 2D code program 140. In some embodiments, the access device 130 may access the 2D code program 140 from server 120 through a signal via a wireless or wireline transmission channel 150. The 2D code program 140 is configured to execute a set of modules from memory 122. The modules include a receiver module 140a, a currentness module 140b, a transmission module 140c, and a delivery module 140d. Each module is described herein. The receiver module 140a is configured to receive a signal associated with a two dimensional (2D) code where the 2D code is associated with a set of data. After the receiver module 140a, the currentness module 140b is configured to generate a currentness signal associated with the set of data. An exemplary set of data may include currentness information, supplement information and print date of the supplement information. The transmission module 140c is configured to transmit the currentness signal to access device 130 through a signal via a wireless or wireline transmission channel 150. In some embodiments, a delivery module 140d is configured to receive a download signal associated with a purchase transaction, the set of data and an electronic file. A purchase transaction is described herein. Furthermore, the delivery module 140d is configured to generate and transmit a delivery signal associated with the electronic file. See the Working Example for additional discussion of system 100.

Exemplary Method as Conducted by System 100

Figure 2:
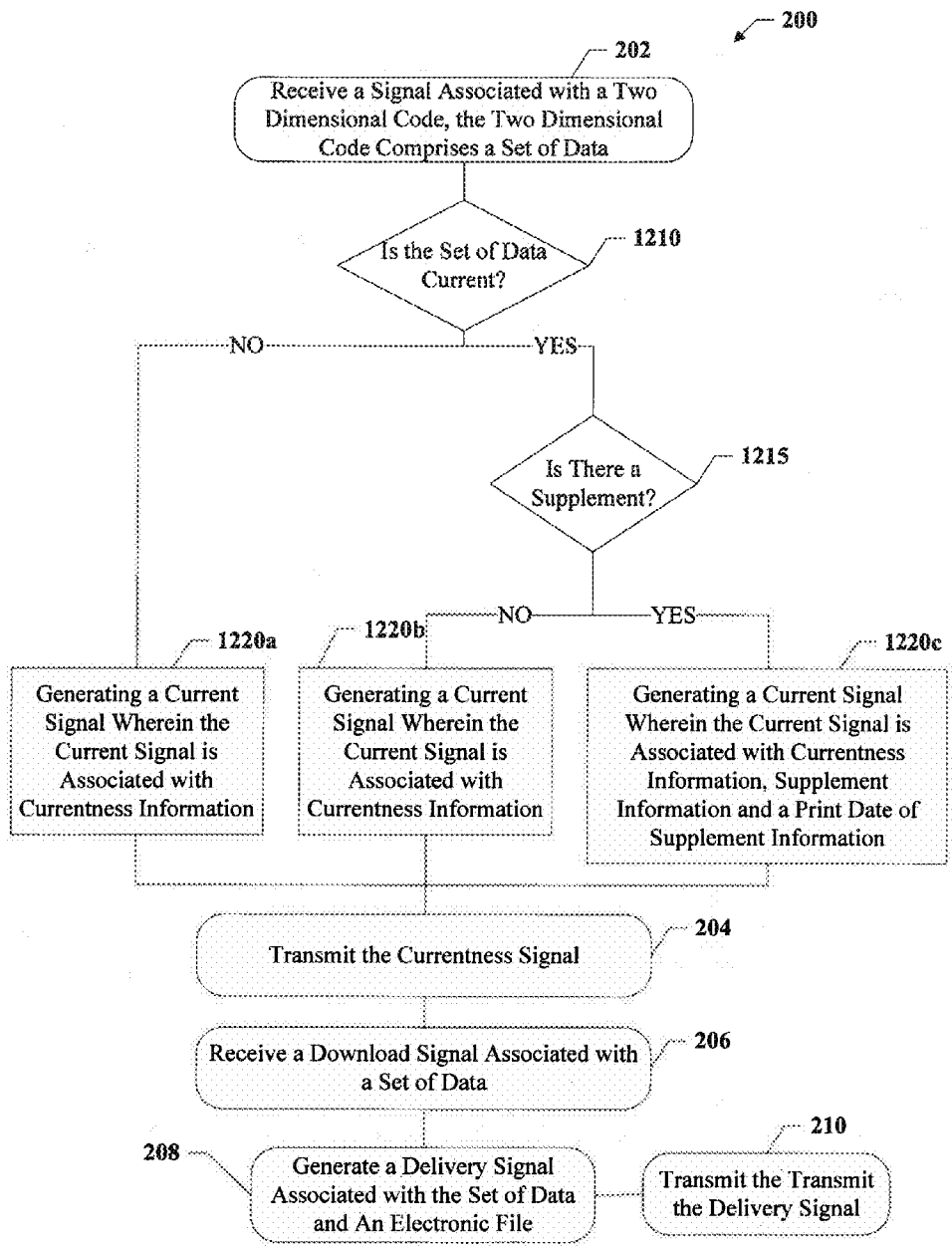
FIG. 2 is an exemplary method 200 which corresponds to one or more embodiments of the invention.

Referring now to FIG. 2, system 100 is configured to implement method 200. Method 200 includes functional blocks 202-210 and 1210-1220a-c. These functional blocks are steps that perform actions including assignments, decisions, assessments and other like functions.

In some embodiments, prior to commencing method 200, a user finds a print book, for example, with a quick reference code (i.e., 2D code). The user then takes an access device with camera capability and quick reference code software. The software reads the quick reference code with an embedded unique resource locator (URL). The URL directs the access device to server 120. Next, in some embodiments, the URL is automatically invoked. In other embodiments, a prompt is displayed asking the user whether the access device should navigate to the URL destination. Either way, once the URL is invoked, step 202 commences. In step 202, the server 120, particularly the receiver module 140a, receives a signal associated with a two dimensional code. The two dimensional code, for example, a quick reference code, is associated with a set of data. In some embodiments the set of data includes a URL having a unique identifier. Referring back to the previous example, a quick reference code, associated with a print book, is scanned. Embedded within that quick reference code is a URL having a unique identifier (e.g., see version identifier 326 in FIG. 3) that navigates the access device to a particular print book version on server 120. Next, given the unique identifier from the embedded URL within the quick reference code, the process proceeds to step 1210.

Figure 3:
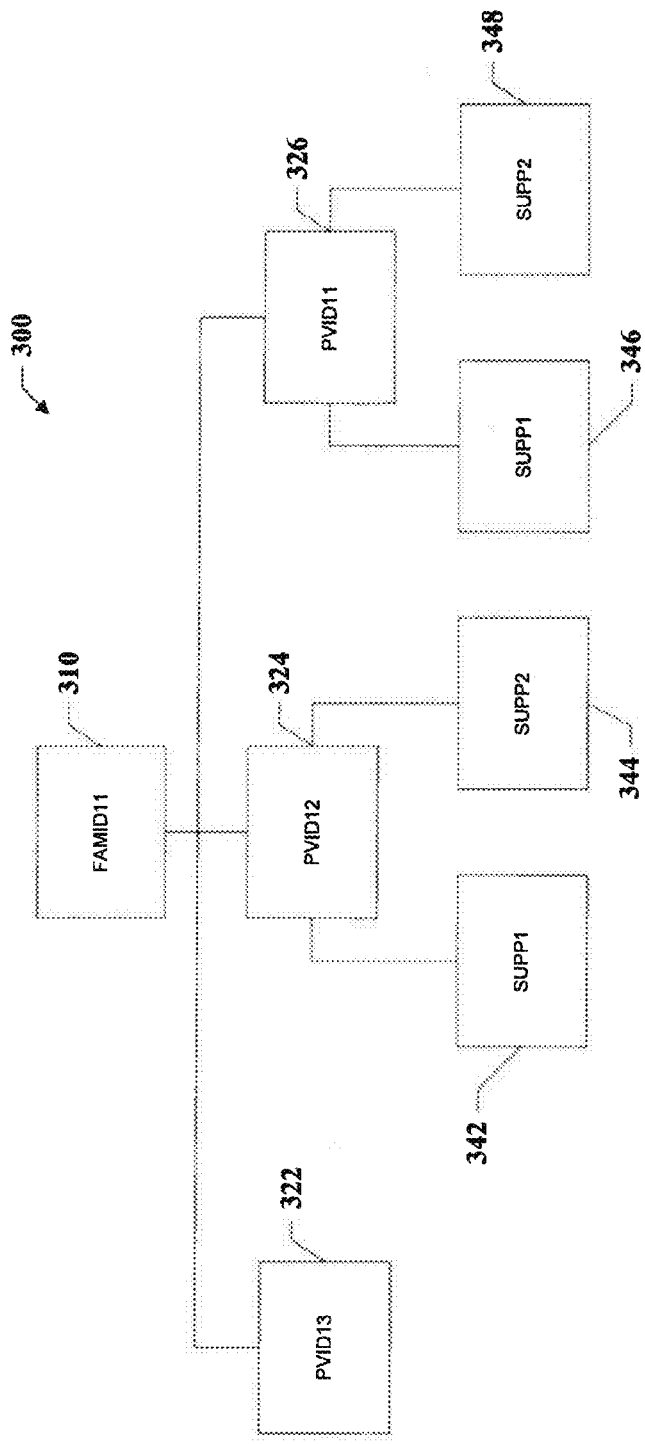
FIG. 3 is an exemplary version tree 300 which corresponds to one or more embodiments of the invention.

In step 1210, a determination is needed as to whether the set of data is current. In order to determine the currentness of the set of data, a version tree is utilized. The version tree assists in determining the currentness of the set of data and the existence of a supplement. The version tree is stored within content database 124 and searched using search module 123. FIG. 3 is an exemplary version tree 300 for print book X. Version tree 300 includes a family identifier 310, version identifiers for print book X 322, 324, 326, and supplement identifiers for print book X 342, 344, 346, 348. The family identifier 310 may represent, for example, a print book X's title. The version identifiers for print book X may represent, for example, print book X's title along with a publishing year to establish a version sequence within the family. An exemplary set of data may include a URL containing a version identifier for print book X. The supplement identifiers may, for example, represent a print book X's title along with the print date of the supplement to establish a supplement sequence within a specific version identifier. For example, version tree 300 has a family identifier 310 that represents a print book entitled "Federal Court Rules of Civil Procedure." The version identifiers 322, 324, 326 represent the three separate versions of the print book title. For instance, version identifier 322 is the print book title "Federal Court Rules of Civil Procedure" with a 2011 publishing year, version identifier 324 is the print book title "Federal Court Rules of Civil Procedure" with a 2010 publishing year and version identifier 326 is the print book title "Federal Court Rules of Civil Procedure" with a 2009 publishing year. Given a specific version identifier, search module 123 is configured to query the version tree 300 to locate the specified version identifier and determine if a more current version exists. Referring back to FIG. 2, if the set of data (i.e., the version identifier) is not current, then the process proceeds to step 1220a. In step 1220a, a currentness signal is generated, via currentness module 140b, wherein the current signal is associated with currentness information. The currentness information may include a statement regarding currentness of the set of data. When the determination is made that the set of data is not current, a statement regarding the lack of currentness is associated with the currentness signal. For example, an exemplary statement regarding the lack of currentness may assert, "This book is not current." If the set of data is current, the process continues to step 1215.

In step 1215, a determination is needed as to whether a supplement exists. Again referring to FIG. 3, the version tree 300 assists in determining the existence of a supplement for a specified version identifier. For example, version identifier 322 has no supplements. Therefore, referring back to FIG. 2, if no supplement exists, the process proceeds to step 1220b.

In step 1220b, a currentness signal is generated, via currentness module 140b, wherein the current signal is associated with currentness information. The currentness information may include a statement regarding currentness of the set of data. When the determination is made that the set of data is current, a statement regarding confirmation of currentness is associated with the currentness signal. In some embodiments, when no supplement exists, the currentness signal is only associated with a statement associated with currentness information. For instance, an exemplary statement regarding currentness may assert, "This book is current." In other embodiments, an additional statement regarding supplement information (i.e., information regarding the lack of a supplement) may also be associated with the currentness signal. For instance, an exemplary statement regarding currentness may assert, "This book is current and no supplement exists." Either way, a currentness signal is generated. If a supplement does exist, the process advances to step 1220c.

If a supplement does exist, in step 1220c, a currentness signal is generated, via currentness module 140b, wherein the current signal is associated with currentness information, supplement information and a print date of supplement information. Supplement information is associated with a statement regarding the supplement. Referring back to FIG. 3, for example, if version identifier 326 were determined to be the most current version, the version tree 300 would assist in establishing that two supplements exist under version identifier 326 and supplement identifier 348 is the most current (i.e., has the most recent supplement print date within version identifier 326). Next, using the currentness information, supplement information and a print date of supplement information, a currentness signal is generated. For instance, the set of data is considered current and a supplement exists with a print date of February 2011. An exemplary currentness signal is associated with a statement such as "This book is current with February 2011 Supplement." This statement informs the user the book is current and a supplement exists with a print date of February 2011. See also FIG. 4-5 and their corresponding descriptions for a Working Example. Once a currentness signal is generated via step 1220a, 1220b or 1220c, the process then moves to step 204.

In step 204, the currentness signal is transmitted, via transmission module 140c, to display 1381 and other various components within access device 130, via a wireless or wireline transmission channel 150. Display systems and interfaces are described herein and/or are known to those skilled in the art.

In some exemplary embodiments, after the user views the currentness and/or supplement information, the user may want to purchase the content. If so, the process continues to step 206. In step 206, server 120, particularly delivery module 140d, receives a download signal associated with a purchase transaction, the set of data and an electronic file. A purchase transaction is a transaction where the user has initiated a purchase of content. Exemplary purchase transactions are illustrated in the Working Example and corresponding description. Server 120 then uses the set of data to search via search module 123 to retrieve an electronic file associated with the set of data from content database 124. Once the electronic file is retrieved, the exemplary embodiment proceeds to step 208. In step 208, a delivery signal is generated wherein the delivery signal is associated with the set of data and the electronic file. Finally, in step 210, the delivery signal is transmitted to access device 130, particularly display 1381, via a wireless or wireline transmission channel 150. See also FIG. 4-5 and their corresponding descriptions for a Working Example.

Working Example

Figure 4:
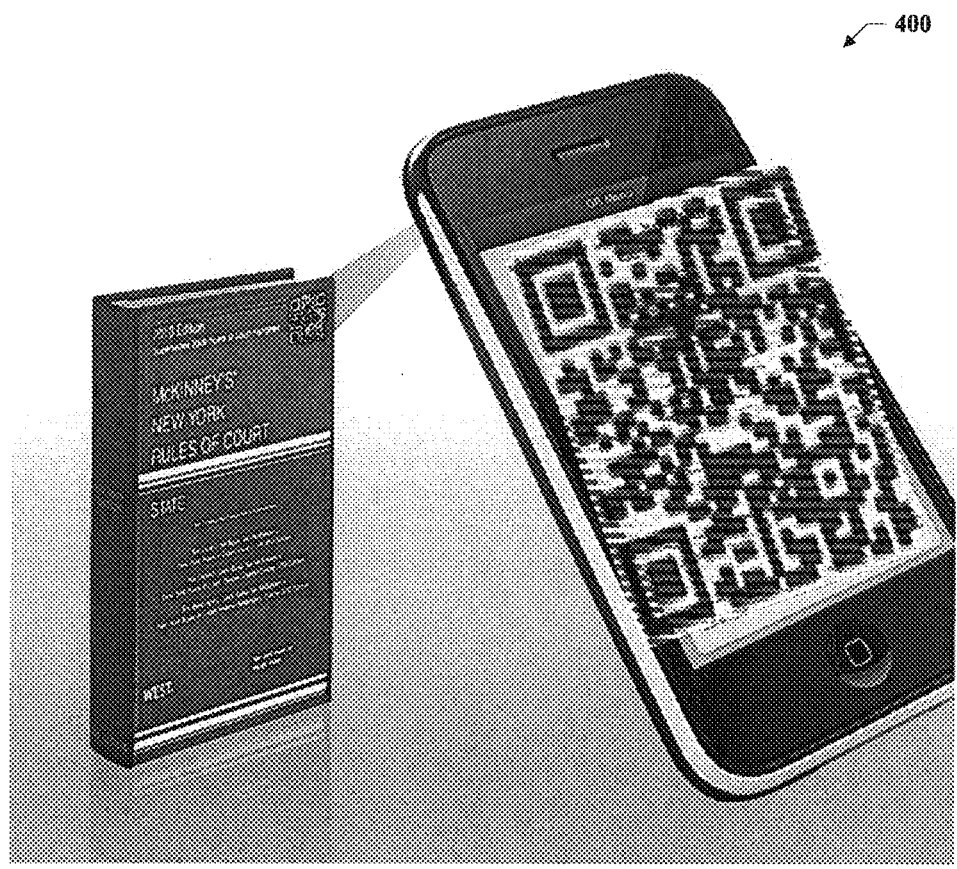
FIG. 4 is an exemplary scanning illustration 400 which corresponds to a working example of one or more embodiments of the invention.
Figure 5:
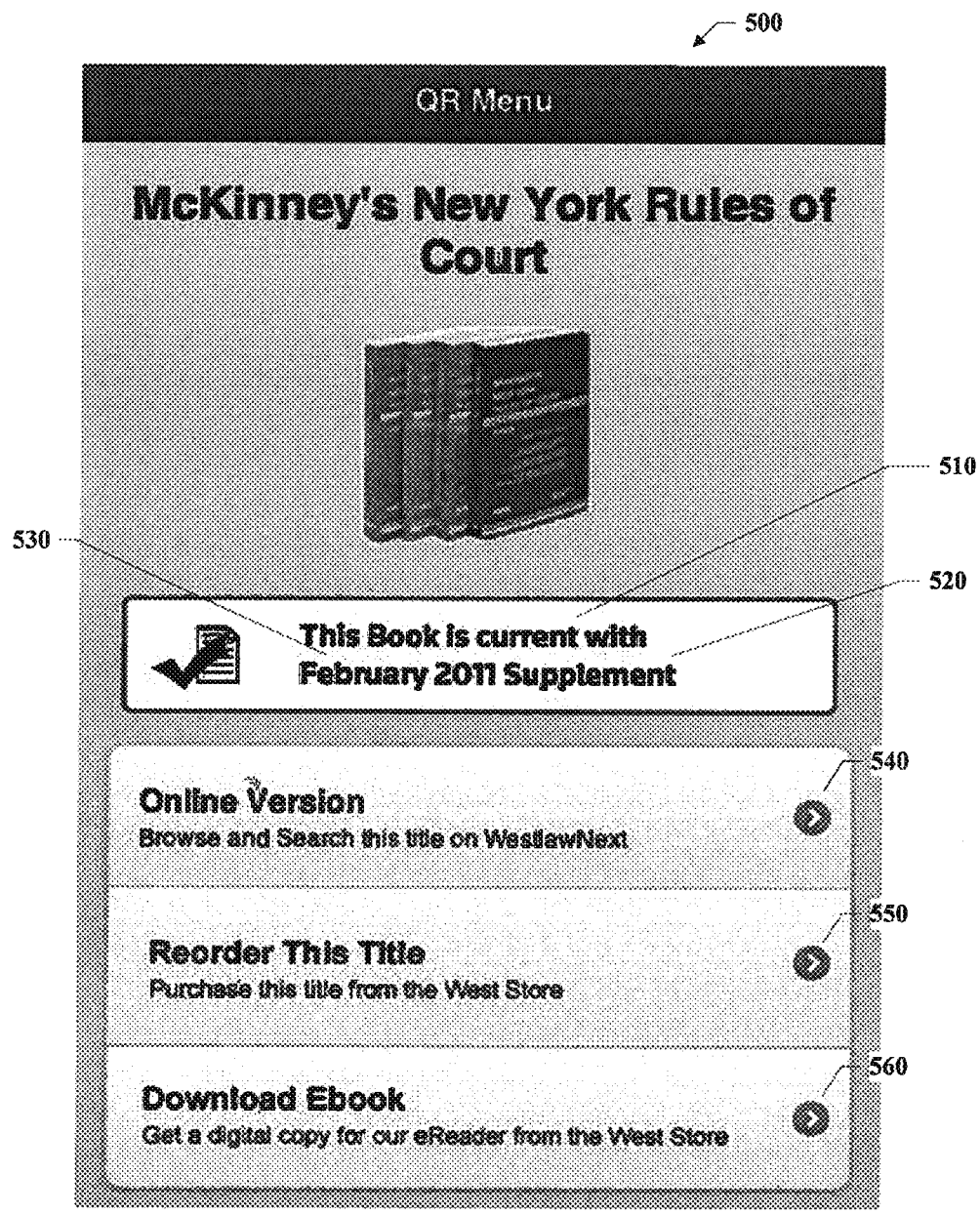
FIG. 5 is an exemplary landing page 500 which corresponds to a working example of one or more embodiments of the invention.

FIGS. 4-5 show a working example for system 100, method 200 and version tree 300, which may be adapted to incorporate the capabilities, functions, systems and methods of the present invention.

FIG. 4 is an exemplary scanning illustration 400 for the working example where the user has come across a print book entitled "McKinney's New York Rules of Court." This print book has a two dimensional code (e.g., a quick reference code) located in the upper right hand corner on the print book cover. The user then uses, for example, a smartphone enabled with a camera and a 2D code reading application. The smartphone captures a picture of the 2D code and the application reads the 2D code. At this point, a URL embedded within the 2D code is read and method 200, as conducted by system 100, initiates. In this example, the URL contains a version identifier for the print book title "McKinney's New York Rules of Court." Referring back to FIG. 3, the exemplary version identifier mentioned in the URL is version identifier 326. From this version tree, currentness information including a currentness statement is determined. Additionally, the version tree 300 further determines if a supplement exists for this version identifier. In this instance, supplement identifier 348 is considered the latest supplement from version identifier 326. From the supplement identifier 348, a supplement statement and supplement print date are determined to provide a statement that is ultimately displayed to the user.

FIG. 5 further depicts an exemplary landing page 500 of the working example wherein information is displayed to the user after completing method 200, as conducted by system 100, and utilizing version tree 300. A landing page is a webpage that presents various information and options to the user. In particular, a statement regarding the currentness and supplement information is displayed. The statement states "This Book is current with February 2011 Supplement." The wording regarding the book being current comes from the currentness information 510 associated with a currentness statement. The wording regarding the February 2011 supplement comes from the supplement information 520 associated with a supplement statement and a print date for the supplement 530. The currentness information 510, the supplement information 520 and the print date for the supplement 530 are associated with an exemplary currentness signal that may ultimately be displayed to the user as shown, for example, in FIG. 5.

The user is also provided with options on how to view, access and/or purchase the most current content. Options include online viewing by selecting the "Online Version" button 540; print book ordering by selecting the "Reorder This Title" button 550; and downloading an eBook by selecting the "Download Ebook" button 560. Online viewing, print book ordering and downloading an eBook are all examples of purchase transactions. Each option is discussed herein. First, by selecting the "Online Version" button 540 the user is allowed to view the content online using information retrieval systems such as WESTLAW® or WESTLAWNEXT®. Subscriptions to such information retrieval systems may be needed in order to access an online version, for example, of "McKinney's New York Rules of Court." A subscription is an additional example of a purchase transaction. Second, by selecting the "Reorder This Title" button 550, the user navigates to a virtual store such as the WEST® store in order to purchase the latest print book version of "McKinney's New York Rules of Court." Third, by selecting the "Download Ebook" button 560, a user is permitted to purchase and download a digital copy of the latest electronic version of "McKinney's New York Rules of Court." Again, a virtual store such as the WEST@ store may be used to purchase the latest digital copy. Various pricing structures are known to those skilled in the art. For example, a one-time price could be established for the options discussed above. As another example, a monthly licensing fee could be established for the options discussed above.

The embodiments described above and in the claims are intended only to illustrate and teach one or more ways of practicing or implementing the present invention, not to restrict its breadth or scope. For example, the search module 123 may be stored within the 2D code program 140. Any location within the memory 122 where data can be temporarily and/or permanently stored is acceptable as the computer bus 103 enables the components within the memory 122 to communicate. Another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

What is claimed is:

1. A method comprising:
   receiving a signal associated with a two dimensional code, the two dimensional code being associated with a set of data having an associated version;
   determining a currentness status of the set of data using a version tree, the version tree comprising a set of versions of the set of data, wherein the currentness status is based in part on determining whether the associated version of the set of data is a temporally most recent version from the set of versions of the set of data, and wherein the temporally most recent version from the set of versions of the set of data represents the most recently published version of the set of data;
   generating a currentness signal based on the currentness status, wherein the currentness signal is associated with a set of currentness information derived from the currentness status, wherein the currentness information comprises a statement regarding currentness of the set of publication data; and
   transmitting the currentness signal.

2. The method of claim 1 wherein the set of data comprises at least one unique identifier.

3. The method of claim 2 wherein the at least one unique identifier comprises a version identifier.

4. The method of claim 1 further comprising:
   receiving a download signal associated with a purchase transaction, the set of data and an electronic file;
   generating a delivery signal associated with the electronic file; and
   transmitting a delivery signal.

5. The method of claim 4 wherein the electronic file is an electronic book.

6. The method of claim 5 wherein the electronic book is at least one of a treatise, court rules, regulations, statutes, or legal cases.

7. The method of claim 1 wherein the currentness signal is further associated with at least one of a set of supplement information or a set of print dates of supplement information.

8. A system comprising:
   a processor;
   a memory coupled to the processor;
   a two dimensional code program stored in the memory for execution by the processor, the two dimensional code program comprising:
      a receiver module configured to receive a signal associated with a two dimensional code, the two dimensional code being associated with a set of data having an associated version;
      a currentness module configured to:
         determine a currentness status of the set of data using a version tree, the version tree comprising a set of versions of the set of data, wherein the currentness status is based in part on determining whether the associated version of the set of data is a temporally most recent version from the set of versions of the set of data, and wherein the temporally most recent version from the set of versions of the set of data represents the most recently published version of the set of data;
         generate a currentness signal based on the currentness status, wherein the currentness signal is associated with a set of currentness information derived from the currentness status, wherein the currentness information comprises a statement regarding currentness of the set of publication data; and
      a transmission module configured to transmit the currentness signal.

9. The system of claim 8 wherein the set of data comprises at least one unique identifier.

10. The system of claim 9 wherein the at least one unique identifier comprises a version identifier.

11. The system of claim 8 wherein the two dimensional code program further comprises a delivery module, the delivery module is configured to:
    receive a download signal associated with a purchase transaction, the set of data and an electronic file;
    generate a delivery signal associated with the electronic file; and
    transmit a delivery signal.

12. The system of claim 11 wherein the electronic file is an electronic book.

13. The system of claim 12 wherein the electronic book is at least one of a treatise, regulations, statutes, or legal cases.

14. The system of claim 11 wherein the currentness signal is further associated with at least one of a set of supplement information or a set of print dates of supplement information.

* * * * *